United States Patent [19]

Kleine et al.

[11] 4,391,960
[45] Jul. 5, 1983

[54] PROCESS FOR THE POLYMERIZATION OF VINYL HALIDE POLYMERS

[75] Inventors: Willi Kleine; Werner Frey, both of Burghausen, Fed. Rep. of Germany

[73] Assignee: Wacker-Chemie GmbH, Munich, Fed. Rep. of Germany

[21] Appl. No.: 270,483

[22] Filed: Jun. 4, 1981

[30] Foreign Application Priority Data

Jul. 3, 1980 [DE] Fed. Rep. of Germany ....... 3025171

[51] Int. Cl.$^3$ ............................................... C08F 2/20
[52] U.S. Cl. ..................................... 526/74; 526/208; 526/212
[58] Field of Search .................. 526/62, 74, 208, 210, 526/212

[56] References Cited

U.S. PATENT DOCUMENTS 3,669,946 6/1972 Koyanagi .............................. 526/62
3,835,105 9/1974 Fendel .................................. 526/208

FOREIGN PATENT DOCUMENTS 54-7489 1/1979 Japan ..................................... 526/74

*Primary Examiner*—C. A. Henderson
*Attorney, Agent, or Firm*—Hammond & Littell, Weissenberger and Muserlian

[57] ABSTRACT

An improvement in the process for the polymerization of vinyl halide polymers comprising polymerizing at least one vinyl halide and, optionally, other olefinically-unsaturated monomers copolymerizable with vinyl halides, in an aqueous dispersion in the presence of free-radical-forming polymerization initiators, dispersants and, optionally, other additives in the presence of an inhibitor of polymer deposits and recovering said vinyl halide polymers, the improvement consisting essentially of adding to the reaction mixture from 10 to 1,000 ppm, based on the monomers, of at least one carbonyl compound having the formula:

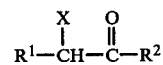

wherein $R^1$ is selected from the group consisting of hydrogen and a hydrocarbon having from 1 to 9 carbon atoms selected from the group consisting of alkyl, aryl, alkaryl and aralkyl; $R^2$ represents an oxyhydrocarbon having from 1 to 9 carbon atoms selected from the group consisting of alkoxy, aryloxy, alkaryloxy and aralkoxy, and a hydrocarbon having from 1 to 9 carbon atoms selected from the group consisting of alkyl, aryl, alkaryl and aralkyl; X is selected from the group consisting of hydroxy and $R^3$—CO—, wherein $R^3$ represents a hydrocarbon having from 1 to 9 carbon atoms selected from the group consisting of alkyl, aryl, alkaryl and aralkyl; as said inhibitor of polymer deposits.

11 Claims, No Drawings

PROCESS FOR THE POLYMERIZATION OF VINYL HALIDE POLYMERS

BACKGROUND OF THE INVENTION

The invention relates to an improved process for the manufacture of vinyl halide polymers in aqueous dispersions.

In all known processes for the polymerization of vinyl halides, optionally together with other monomers, in aqueous dispersion, heavy polymer deposits are formed, to a greater or lesser extent, on the inner surfaces and fittings of the reaction vessel. Because of their considerable thermal insulation properties, those coatings prevent the controlled removal of the heat of polymerization. That causes a problem, especially in large reactors, which, owing to the shorter cycle per unit of product quantity and therefore the smaller amount of work involved, are especially advantageous economically. For safety reasons, polymerization batches can therefore be operated only at low polymerization rates.

The deposits often enter the product, however, and in some cases considerably impair its quality, for example, as a result of specks (fish-eyes) in the finished product.

For those reasons, it is necessary to clean the reaction vessels thoroughly after each charge, using pressurized water-jet devices, or in many cases, by hand by means of spatulas. This is not only uneconomical, but also requires extensive safety precautions to avoid endangering the health of the operating personnel and to avoid introduction of vinyl halide vapors in the plant atmosphere.

It is therefore desirable and necessary, especially from the point of view of hygienic working conditions, to prevent, or at least reduce substantially, such polymer deposits in the reactor. Many attempts have therefore already been made to achieve that aim.

For example, DE-OS No. 27 39 708, corresponding to British Pat. No. 1,554,499, proposes using salts of organic hydroxylated carboxylic acids, such as citrates, lactates and tartrates, as part of the polymerization charge, but deposits on the walls are still not satisfactorily prevented thereby.

The coating of the reactor wall with polar organic compounds, for example, organic sulfur compounds or quinones, together with at least one organic dyestuff and at least one inorganic pigment (DE-OS No. 20 44 259, abstracted in Chem. Abstracts 77, 20374t [1972]) or condensation products of polyhydric phenols, for example, hydroquinones (DE-OS No. 28 26 681, corresponding to U.S. Pat. No. 4,080,173) or of polyaromatic amines (U.S. Pat. No. 4,024,301), is very expensive since those coatings have to be renewed after only a small number of batches and the coating substances can have a detrimental effect on both the reaction and the quality of the product.

OBJECTS OF THE INVENTION

An object of the present invention is the development of an improved process for the polymerization of vinyl halide polymers in aqueous dispersions employing inhibitors of polymer deposits.

Another object of the present invention is the development of an improvement in the process for the polymerization of vinyl halide polymers comprising polymerizing at least one vinyl halide and, optionally, other olefinically-unsaturated monomers copolymerizable with vinyl halides, in an aqueous dispersion in the presence of free-radical-forming polymerization initiators, dispersants and, optionally, other additives in the presence of an inhibitor of polymer deposits and recovering said vinyl halide polymers, the improvement consisting essentially of adding to the reaction mixture from 10 to 1,000 ppm, based on the monomers, of at least one carbonyl compound having the formula:

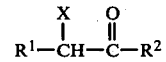

wherein $R^1$ is selected from the group consisting of hydrogen and a hydrocarbon having from 1 to 9 carbon atoms selected from the group consisting of alkyl, aryl, alkaryl and aralkyl; $R^2$ represents an oxyhydrocarbon having from 1 to 9 carbon atoms selected from the group consisting of alkoxy, aryloxy, alkaryloxy and aralkoxy, and a hydrocarbon having from 1 to 9 carbon atoms selected from the group consisting of alkyl, aryl, alkaryl and aralkyl; X is selected from the group consisting of hydroxy and $R^3$—CO—, wherein $R^3$ represents a hydrocarbon having from 1 to 9 carbon atoms selected from the group consisting of alkyl, aryl, alkaryl and aralkyl; as said inhibitor of polymer deposits.

These and other objects of the invention will become more apparent as the description thereof proceeds.

DESCRIPTION OF THE INVENTION

A process has now been found which surprisingly largely prevents the encrustation of the walls of the reaction vessel and has no detrimental effects on the reaction or the product.

The subject of the invention is a process for the manufacture of vinyl halide polymers, preferably vinyl chloride polymers, by polymerizing vinyl halides and, optionally, other olefinically-unsaturated monomers copolymerizable with vinyl halides in aqueous dispersion in the presence of free-radical-forming initiators, dispersants and, optionally, other additives characterized in that at least one compound of the formula:

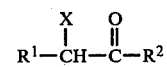

in which
$R^1$ denotes hydrogen, alkyl, aryl, alkaryl or aralkyl,
$R^2$ denotes alkoxy, aryloxy, alkaryloxy, aralkoxy, alkyl, aryl, alkaryl or aralkyl,
X denotes hydroxy or $R^3$—CO—, and
$R^3$ denotes alkyl, aryl, alkaryl, or aralkyl, is added to the reaction mixture in quantities of from 10 to 1,000 ppm, based on the monomer(s).

More particularly, the present invention relates to an improvement in the process for the polymerization of vinyl halide polymers comprising polymerizing at least one vinyl halide and, optionally, other olefinically-unsaturated monomers copolymerizable with vinyl halides, in an aqueous dispersion in the presence of free-radical-forming polymerization initiators, dispersants and, optionally, other additives in the presence of an inhibitor of polymer deposits and recovering said vinyl halide polymers, the improvement consisting essentially of adding to the reaction mixture from 10 to 1,000 ppm, based on the monomers, of at least one carbonyl compound having the formula:

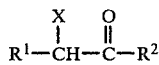

wherein $R^1$ is selected from the group consisting of hydrogen and a hydrocarbon having from 1 to 9 carbon atoms selected from the group consisting of alkyl, aryl, alkaryl and aralkyl; $R^2$ represents an oxyhydrocarbon having from 1 to 9 carbon atoms selected from the group consisting of alkoxy, aryloxy, alkaryloxy and aralkoxy, and a hydrocarbon having from 1 to 9 carbon atoms selected from the group consisting of alkyl, aryl, alkaryl and aralkyl; X is selected from the group consisting of hydroxy and $R^3$—CO—, wherein $R^3$ represents a hydrocarbon having from 1 to 9 carbon atoms selected from the group consisting of alkyl, aryl, alkaryl and aralkyl; as said inhibitor of polymer deposits.

The process according to the invention is used for the manufacture of optionally grafted homopolymers or copolymers of vinyl halides, that is to say, vinyl fluoride, vinyl bromide, and also vinylidene fluoride and vinylidene chloride, and preferably of vinyl chloride homopolymers.

The copolymers may contain one or more of the above-mentioned vinyl halides, where preferably at least 60% by weight of said vinyl halide, such as vinyl chloride, based on the total weight of the monomers, is used in the polymerization process.

Examples of other ethylenically-unsaturated monomers copolymerizable with vinyl halides that may likewise be incorporated, by polymerization, in the copolymers manufactured according to the invention are:

(1) α-olefins having from 2 to 8 carbon atoms, for example, ethylene, propylene and isobutylene;
(2) styrene;
(3) vinyl esters of straight-chain or branched, preferably saturated alkanoic acids having from 2 to 20, preferably from 2 to 4 carbon atoms, for example, vinyl acetate, vinyl propionate, vinyl butyrate, vinyl 2-ethylhexanoate, vinyl laurate, and vinyl esters of carboxylic acids manufactured by Koch synthesis and branched in the α-position (vinyl Versatic acid esters— "Versatic" is a registered trademark of Shell AG);
(4) unsaturated monocarboxylic and dicarboxylic acids, such as alkenoic acids having from 3 to 6 carbon atoms, for example, crotonic acid, acrylic acid and methacrylic acid, and alkendioic acids having from 4 to 6 carbon atoms, such as maleic acid, fumaric acid and itaconic acid;
(5) esters of said alkenoic acids with alkanols having from 1 to 10 carbon atoms;
(6) monoesters and diesters of said alkendioic acids with alkanols having from 1 to 10 carbon atoms;
(7) amides of said alkenoic acids;
(8) monoamides and diamides of said alkendioic acids;
(9) imides of said alkendioic acids;
(10) acid anhydrides of said alkendioic acids, and
(11) acrylonitrile and methacrylonitrile.

Preferably at least 60% by weight of at least one vinyl halide, such as vinyl chloride, based on the total weight of the monomers, is always used in the monomer mixtures to be polymerized according to the invention.

Especially preferred is the manufacture according to the invention of homopolymers of vinyl chloride and copolymers of vinyl chloride having up to 40% by weight, based on the monomers, of ethylene, vinyl esters, especially vinyl acetate, unsaturated carboxylic acids and/or esters of those carboxylic acids.

The polymerization according to the invention can be carried out in conventional reactors, especially agitator autoclaves, preferably at temperatures of from 30° to 80° C. If desired, higher or lower temperatures may, of course, be used, for example, when using special initiator systems.

Suitable initiators are all those that have been used hitherto in the polymerization of the above-mentioned monomers (see Houben-Weyl, "Methoden der organischen Chemie," Vol. 14/1 (1961), pp. 209–297). Those that are soluble in the monomers (generally known as oil-soluble catalysts) and that are generally used in suspension and microsuspension polymerization processes, are preferred. Examples of suitable initiators are: diacyl peroxides, for example, diacetyl peroxide, acetylbenzoyl peroxide, dilauroyl peroxide and dibenzoyl peroxide; dialkyl peroxides, such as di-tert-butyl peroxide; peresters, such as tert-butyl peracetate, isopropyl peracetate, tert-butyl perpivalate, tert-butyl peroxyneodecanoate and tert-butyl peroctoate; dialkyl peroxydicarbonates, such as diisopropyl peroxydicarbonate, diethylhexyl peroxydicarbonate, dicyclohexyl peroxydicarbonate, diethylcyclohexyl peroxydicarbonate, dicetyl peroxydicarbonate, and di-tert-butylcyclohexyl peroxydicarbonate; mixed anhydrides of organic sulfo peracids and organic acids, for example, acetylcyclohexylsulfonyl peroxide; α-alkyl-substituted acyl peroxides and azo compounds, such as azoisobutyronitrile and boronalkyls; and also redox catalysts in which case compounds from the above-mentioned groups are preferably used as the peroxy component.

The catalysts can be used individually or in admixture, in quantities of preferably from 0.01% to 1% by weight, especially from 0.01% to 0.3% by weight, based on the monomer(s).

The process according to the invention can generally be carried out at pressures of up to 200 bar and, optionally, at even higher pressures. The pressures preferably used are, however, those corresponding to the vapor pressures of the monomers at the particular reaction temperatures, often referred to as the autogenic pressure of the monomer. Monomers that are gaseous at room temperature and that can be liquefied in the specified pressure and temperature ranges, especially vinyl chloride can, however, alternatively be fed in at the rate at which they are consumed in such a manner that there is no liquid phase of those monomers. On the other hand, it has frequently proved advantageous in the case of other gaseous monomers, especially ethylene, to use pressures other than autogenic pressures, for example, from 5 to 100 bar.

The process according to the invention is carried out in the aqueous phase. The monomer/water ratio is not of decisive importance and in many cases a ratio of approximately from 1:3 to 1:1 is used. It is quite possible to meter in individual components or several components in known manner during the process, for example, the decrease in volume of the reaction mixture during the reaction can be compensated for by the addition of water. If the water is metered in, for example, by means of a spray device for spraying the dome of the autoclave, then a certain quantity of the wall-deposit inhibitor of the formula:

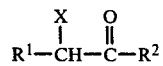

can advantageously be added to it. Often those compounds are advantageously added to the water in quantities such that they are present in the metered-in water in the same concentration as that in which they are already present in the reaction mixture.

Preferred wall deposit inhibitors in the process according to the invention are those compounds used individually or as mixtures of the formula:

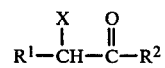

in which $R^1$, $R^2$ and X have the following meanings:
  $R^1$ denotes hydrogen, or an aliphatic or aromatic hydrocarbon radical having from 1 to approximately 9 carbon atoms, which preferably contains no ethylenic unsaturation, for example, phenyl which may optionally be substituted by one or more groups, especially methyl groups (such as cumyl, tolyl, xylyl, mesityl or ethylphenyl) or an aralkyl radical (such as benzyl, phenethyl or methylbenzyl); especially preferred are straight-chain or branched, preferably saturated, alkyl radicals having from 1 to approximately 9 carbon atoms, especially from 1 to 4 carbon atoms (such as methyl, ethyl, propyl and butyl, methyl again being preferred);
  $R^2$ independently of $R^1$ has the same meanings as those given for $R^1$ (except hydrogen), but may alternatively denote R—O— in which R, independently of $R^1$, may have the same meanings as those given for $R^1$ (except hydrogen), $C_1$–$C_9$-alkyl and $C_1$–$C_9$-alkoxy radicals being preferred, especially in each case those having from 1 to 4 carbon atoms; methyl, methoxy and ethoxy radicals being especially preferred as $R^2$;
  X denotes a hydroxy radical, or an acyl radical of the formula $R^3$—CO— in which $R^3$, independently of $R^1$, may also have the same meanings as those given for $R^1$ (except hydrogen).
Especially preferred are those compounds where $R^1$ is hydrogen, $R^2$ is alkyl or alkoxy and $R^3$ is alkyl.

Even more preferred compounds of the abovementioned formula are lactic acid esters, for example, the methyl or ethyl ester, and especially acetylactone, hydroxyacetone and methyl or ethyl acetoacetate. Optimum results are obtained with acetylacetone.

The wall deposit inhibitor, this being understood as the individual compounds of the above-mentioned formula or mixtures thereof, is generally used in quantities of from 10 to 1,000 ppm, preferably from 50 to 500 ppm, in each case based on the weight of the monomer phase. 100 to 300 parts by weight per $10^6$ parts by weight of monomer(s) are generally sufficient to obtain an optimum effect (ppm=parts per million).

In addition to the components of the reaction mixture mentioned hitherto, dispersing auxiliaries or dispersants, such as protective colloids, and/or emulsifiers are used concomitantly, preferably in total quantities of of from 0.05% to 5%, especially from 0.1% to 1.5% by weight, based on the aqueous phase.

Suitable protective colloids and emulsifiers are all those that have been used hitherto in polymerization reactions of this type (see Houben-Weyl, "Methoden der organischen Chemie," Vol. 14/1 (1961), pp. 192–208 and 411–429).

Preferred examples of protective colloids are polyvinyl alcohols, partially saponified polyvinyl acetates, water-soluble cellulose derivatives, such as, for example, methycellulose, methylhydroxypropylcellulose, hydroxyethylcellulose, methylhydroxyethylcellulose, and carboxymethylcellulose, copolymers of maleic acid anhydride or maleic acid semiesters and styrene or vinyl acetate, and also mixtures of those protective colloids.

Suitable emulsifiers are anionic, cationic, amphoteric and nonionic emulsifiers, for example, alkylsulfonates and arylsulfonates, fatty acid soaps, organic ammonium compounds, ethers of fatty alcohols and fatty amines with glycols and ethoxylated derivatives thereof. It is, of course, possible to use mixtures of emulsifiers.

In addition, other customary auxiliaries may be added to or metered into the reaction mixture in the usual quantities, for example, molecular weight regulators (see Houben-Weyl, Vol. 14/1 (1961), pp. 297–333), such as aliphatic aldehydes, carbon chloride or chlorohydrocarbons, for example, dichloroethylene and trichloroethylene, chloroform, and mercaptans, or buffer substances, such as sodium and potassium bicarbonates, sodium carbonate, potassium carbonate, alkali metal (hydrogen) phosphates and alkali metal acetates. Those buffer substances may optionally be added in case the pH value of the polymerization batch does not remain within the preferred range of from 2 to 10, especially from 3 to 7. When carrying out the polymerization in the alkaline range (pH>7), it is alternatively possible for the wall deposit inhibitors to be present in the form of salts, for example, in the form of alkali metal salts. Accordingly, it is also possible to use them optionally as salts, for example, sodium acetylacetonate.

The following examples explain the invention further without being limitative. All quantities and concentrations are based on weight unless otherwise stated.

EXAMPLES

The reactor was a one-liter steel autoclave. The following recipe was charged therein:

| Parts by Weight | |
|---|---|
| 200.0 | Deionized water, |
| 100.0 | Vinyl chloride, |
| 0.22 | Commercial polyvinyl alcohol (Polyviol ® M 05/270, Wacker-Chemie GmbH, Munich, Federal Republic of Germany) having a Höppler viscosity at 20° C., in 4% aqueous solution, of 5 mPas, and having an average saponification number of 270, |
| 0.08 | Commercial methylcellulose (Culminal ® MC 255, Henkel KGaA, Dusseldorf, Germany), |
| 0.33 | Dilauroyl peroxide, |
| 0.07 | Dicetyl peroxydicarbonate. | and polymerization was carried out at 59° C., with stirring (400 min$^{-1}$—circumferential speed of the stirrer 1.3 m/s), until the pressure fell to approximately 1.5 bar.

Each of the following examples and comparison examples was carried out in the following manner:
  (1) The autoclave was filled with tetrahydrofuran (THF), and the THF was stirred at 60° C. for 24 hours and then drained off. This measure served to clean the autoclave completely of polymer deposits.

(2) The autoclave was rinsed with acetone until no more THF was detectable.

(3) The autoclave was rinsed with demineralized water.

(4) The autoclave was filled with a 1% aqueous solution of the wall-deposit inhibitor, and the solution was stirred for 24 hours at 60° C. and then drained off. This measure served to obtain a stationary state with respect to the wall deposit inhibitor, as occurs in the case of multiple reaction cycles with the same wall deposit inhibitor. This was to permit an assessment of the effect of the various substances under conditions comparable to those actually occurring in practice.

(5) The polymerization reaction was carried out, with a total of four cycles without mechanical or other cleaning in between cycles (examples according to the invention: comparison examples optionally after pretreatment of the autoclave in accordance with the prior art).

(6) After draining off the fourth reaction batch, the autoclave was treated with THF again as under (1). The THF was drained off and transferred to a weighed flask and the solvent was distilled off. The residue which corresponds to the wall deposit formed was weighed.

COMPARISON EXAMPLES (A) No wall deposit inhibitor.

(B) The reactor wall was coated, in accordance with DE-OS No. 20 44 259, with a solution of 1 gm of a commercial dyestuff (Nigrosin® W, Bayer AG, Leverkusen, Germany) in 1,000 ml of methanol.

(C) The reactor wall was coated analogously to B, except that 10 gm of polyvinyl alcohol were additionally present in the solution and the solution had a pH of 10.5.

(D) (C) was repeated, except that the methanol was replaced by water.

(E) (C) was repeated, except that the solution was almost neutral and the reactor had been treated beforehand for 24 hours with a 1% aqueous citric acid solution. In addition, 300 ppm of citric acid (based on the monomer) were added, for each batch.

(F) 300 ppm of citric acid (based on the monomer) were added per batch, analogously to DE-OS No. 27 39 708.

| EXAMPLE | |
|---|---|
| 1 | 300 ppm of acetyl acetone (based on the monomer) were added per batch. |
| 2 | 300 ppm of hydroxyacetone (based on the monomer) were added per batch. |
| 3 | 300 ppm of ethyl acetoacetate (based on the monomer) were added per batch. |
| 4 | 300 ppm of ethyl lactate (based on the monomer) were added per batch. |

The results are listed in the following Table.

TABLE

| Comparison Example | Wall Deposit of PVC per 100 Parts of Vinyl Chloride Parts by Weight | Example | Wall Deposit of PVC per 100 Parts of Vinyl Chloride Parts by Weight |
|---|---|---|---|
| A | 2.05 | 1 | 0.03 |
| B | 1.43 | 2 | 0.29 |
| C | 0.80 | 3 | 0.27 |
| D | 1.00 | 4 | 0.33 |
| E | 0.37 | | |
| F | 0.45 | | |

These results clearly demonstrate the unexpected advantage of the use of the inhibitors of polymer deposition of the invention.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In the process for the polymerization of vinyl halide polymers comprising polymerizing at least one vinyl halide and, optionally, other olefinically-unsaturated monomers copolymerizable with vinyl halides, in an aqueous dispersion in the presence of free-radical-forming polymerization initators, dispersants and, other customary additives, in the presence of an inhibitor of polymer deposits and recovering said vinyl halide polymers, the improvement consisting essentially of adding to the reaction mixture from 10 to 1,000 ppm, based on the monomers, of at least one carbonyl compound having the formula:

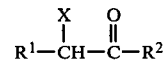

wherein $R^1$ is selected from the group consisting of hydrogen and a straight or branched alkyl having from 1 to 9 carbon atoms; $R^2$ is selected from the group consisting of an alkoxy having from 1 to 9 carbon atoms, and an alkyl having from 1 to 9 carbon atoms; X is selected from the group consisting of hydroxy and $R^3$—CO—, wherein $R^3$ represents an alkyl having from 1 to 9 carbon atoms; as said inhibitor of polymer deposits.

2. The process of claim 1 wherein $R^1$ is hydrogen.

3. The process of claim 2 wherein $R^2$ is a member selected from the group consisting of methyl, methoxy and ethoxy, and X is hydroxy.

4. The process of claim 2 wherein $R^2$ is a member selected from the group consisting of methyl, methoxy and ethoxy and X is $R^3$—CO— where $R^3$ is alkyl.

5. The process of claim 1 wherein $R^1$ is alkyl.

6. The process of claim 5 wherein $R^2$ is a member selected from the group consisting of methyl, methoxy and ethoxy, and X is hydroxy.

7. The process of claim 5 wherein $R^2$ is a member selected from the group consisting of methyl, methoxy and ethoxy and X is $R^3$—CO— where $R^3$ is alkyl.

8. The process of claim 1 or 2 or 5 wherein said carbonyl compound is added in an amount of from 50 to 500 ppm, based on the monomers.

9. The process of claim 1 or 2 or 5 wherein said carbonyl compound is added in an amount of from 100 to 300 ppm, based on the monomers.

10. The process of claim 1 or 2 or 5 wherein the monomers charged in said polymerizing step are from 100% to 60% by weight of a vinyl halide and from 0 to 40% by weight of other olefinically-unsaturated monomers copolymerizable with vinyl halides selected from the group consisting of:
 (1) α-olefins having from 2 to 8 carbon atoms;
 (2) styrene;
 (3) vinyl esters of straight-chain or branched alkanoic acids having from 2 to 20 carbon atoms;
 (4) alkenoic acids having from 3 to 6 carbon atoms, and alkenedioic acids having from 4 to 6 carbon atoms;
 (5) esters of said alkenoic acids with alkanols having from 1 to 10 carbon atoms;
 (6) monoesters and diesters of said alkenedioic acids with alkanols having from 1 to 10 carbon atoms;
 (7) amides of said alkenoic acids;
 (8) monoamides and diamides of said alkenedioic acids;
 (9) imides of said alkenedioic acids;
 (10) acid anhydrides of said alkenedioic acids, and
 (11) acrylonitrile and methacrylonitrile.

11. The process of claim 1 or 2 or 5 wherein the monomer charged in said polymerizing step is vinyl chloride.

* * * * *